(12) United States Patent
Esslinger et al.

(10) Patent No.: US 8,424,758 B2
(45) Date of Patent: *Apr. 23, 2013

(54) STORED VALUE CARD TRANSACTION CONTROL SYSTEMS AND METHODS

(75) Inventors: Bret M Esslinger, Weston, FL (US); Cathy A Olson, Fort Lauderdale, FL (US)

(73) Assignee: First Data Corporation, Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/242,844

(22) Filed: Sep. 23, 2011

(65) Prior Publication Data

US 2012/0067948 A1  Mar. 22, 2012

Related U.S. Application Data

(63) Continuation of application No. 12/111,692, filed on Apr. 29, 2008, now Pat. No. 8,025, 221.

(60) Provisional application No. 60/953,928, filed on Aug. 3, 2007.

(51) Int. Cl.
*G06K 5/00* (2006.01)
(52) U.S. Cl.
USPC .......................................................... 235/380
(58) Field of Classification Search .................. 235/380, 235/383, 385, 492
See application file for complete search history.

(56) References Cited

U.S. PATENT DOCUMENTS

2004/0039694 A1 * 2/2004 Dunn et al. ..................... 705/39

* cited by examiner

*Primary Examiner* — Seung Lee
(74) *Attorney, Agent, or Firm* — Kilpatrick Townsend & Stockton LLP

(57) ABSTRACT

A gift card processing system which includes a database storing interval information representing a required interval between transactions using the gift card. The database also stores data representing the maximum amount of each transaction. The gift card processing system is part of a network that includes POS terminals at merchant locations, where the gift card may be presented. A card ID is read from the card at a POS terminal and used to access the interval data and the maximum transaction amount data.

15 Claims, 3 Drawing Sheets

GIFT CARD DB

| CARD ID | CARD TYPE | CARD BALANCE |
|---|---|---|
| XXXXXX1234 | 0001 | 100.00 |
| XXXXXX1235 | 0002 | 75.50 |
| XXXXXX1236 | 0007 | 100.00 |
| XXXXXX1237 | 0007 | 100.00 |
| XXXXXX1238 | 0007 | 75.00 |
| XXXXXX1239 | 0007 | 50.00 |

FIG. 2

CARD RESTRICTION FILE - CARD TYPE 0007

| CARD ID | ACTIVATE Y/N | LAST USE | REQUIRED INTERVAL | MAX. TRANS AMOUNT |
|---|---|---|---|---|
| XXXXXX1236 | Y | 05302007 | 1 | 5 |
| XXXXXX1237 | Y | 04202007 | 5 | 5 |
| XXXXXX1238 | N | 06012007 | 1 | 20 |
| XXXXXX1239 | Y | 00000000 | 1 | 5 |

FIG. 3

STORED VALUE CARD TRANSACTION CONTROL SYSTEMS AND METHODS

CROSS-REFERENCES TO RELATED APPLICATIONS

This application is a continuation of U.S. patent application Ser. No. 12/111,692, filed Apr. 29, 2008, entitled "STORED VALUE CARD TRANSACTION CONTROL SYSTEMS AND METHODS," which is a nonprovisional of U.S. Provisional Patent Application No. 60/953,928, entitled "STORED VALUE CARD TRANSACTION CONTROL SYSTEMS AND METHODS," and filed on Aug. 3, 2007, the entirety of which is incorporated herein.

BACKGROUND OF THE INVENTION

In recent years, stored value cards, such as prepaid gift cards, have become increasingly popular among consumers. Very often the cards are given by a purchaser (of the card) to a recipient in lieu of cash, so that the recipient will have the means to purchase goods or services from a card issuing merchant. In some cases the purchaser may desire this arrangement so that the recipient does not use the card for purposes other than those intended by the purchaser. As an example, a parent may purchase a stored value card that can be used by a child only at the issuing merchant, so that the child may not use the card for goods other than those sold by that merchant.

One drawback of existing cards is that there is no effective means for controlling card use at the merchant. For example, a parent may give a card issued by a restaurant to a child away at college, desiring that the child use the card in increments for individual meals. However, there is often no effective means to prevent the child from using the card in ways not contemplated by the parent. While cards have been known to place maximum limits on individual purchases (e.g., a $100 gift card may only be used in $10 increments), there is no means available to prevent the recipient of the card from conducting many transactions over a short period of time, quickly depleting the value of the card.

BRIEF SUMMARY OF THE INVENTION

There is provided, in accordance with embodiments of the present invention, a network/system and method for controlling the use of a stored value card, by requiring transactions using the card be separated by a predetermined interval of time.

In one embodiment, the method comprises providing a card ID for a stored value card (e.g., a gift card), storing interval data at a database, the interval data representing a required interval between transactions that are conducted using the card, receiving the card ID data at a POS device when the card is used for a transaction, using the card ID data captured at the POS device to retrieve the interval data, and authorizing the transaction at the POS device only if the required interval has passed since the last transaction. In some embodiments, each transaction is limited to a maximum transaction amount, thereby preventing depletion of card value over a short period of time.

A more complete understanding of the present invention may be derived by referring to the detailed description of the invention and to the claims, when considered in connection with the Figures.

BRIEF DESCRIPTION OF THE DRAWINGS

FIG. 2 illustrates gift card data table in the database seen in FIG. 1.

FIG. 3 illustrates card restriction data table in the database seen in FIG. 1.

DETAILED DESCRIPTION OF THE INVENTION

Figure 1:
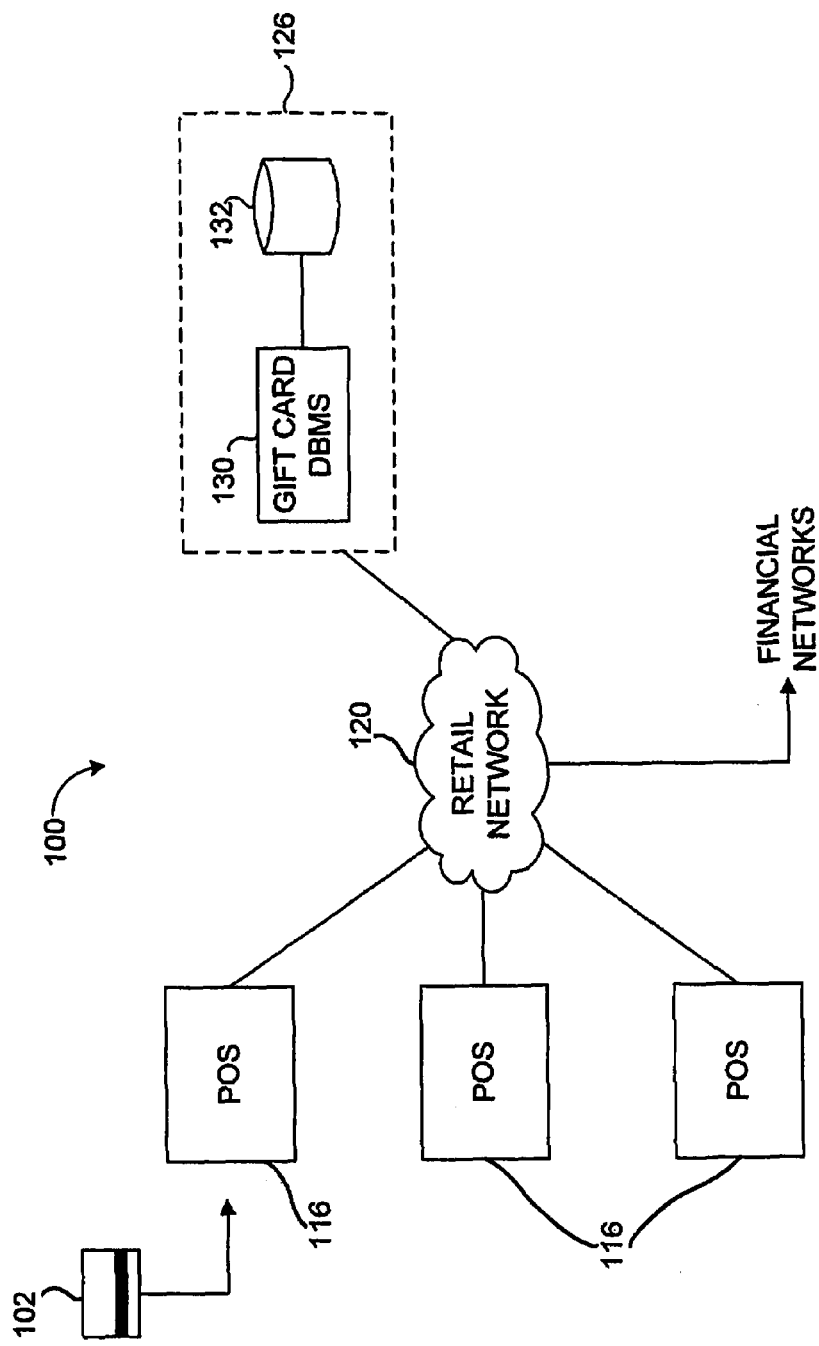
FIG. 1 is a general schematic diagram showing a network for activating and using gift cards.

There are various embodiments and configurations for implementing the present invention. One such implementation is shown in FIG. 1, where according to an embodiment of the invention, a network 100 is illustrated in which stored value cards, such as an illustrated gift card 102, may be activated and then subsequently used for conducting transactions.

The gift card 102 carries a card identifier (ID) or other identifying data, such as may be present on a magnetic stripe. However, gift cards and other stored value cards may carry identifying data using many different means, such as (by way of example only) a memory chip, an RFID (radio frequency identification) tag, a bar code, and other storage or information carrying devices.

The network 100 includes POS terminals or devices 116 at various merchant locations, used for purchasing cards that may be stocked or displayed for sale at the merchant locations, and that, after activation, may be subsequently used for conducting transactions. The POS terminals 116 may be either clerk operated or self-service, and have card readers (e.g., magnetic stripe readers) for reading the ID on the card 102. The POS terminals are connected through a retail network 120 to financial networks (e.g., credit and debit card processing entities, banks and other financial institutions) for purposes of authorizing and conducting credit card and other transactions. In addition, the retail network 120 is connected to a gift card processing system 126, illustrated in FIG. 1 as including a gift card database management system (DBMS) 130 and an associated database 132. The gift card DBMS 130 manages (e.g., stores, accesses and updates) gift card data in the database 132, as will be described below.

The network 100 as described above is known, and detailed descriptions of its structure and operation can be found, for example, in U.S. patent application Ser. No. 10/665,984, filed Sep. 19, 2003 by McGee et al. and entitled "Financial Presentation Instruments with Integrated Holder and Methods for Use," U.S. patent application Ser. No. 11/122,414, filed May 4, 2005 by Seifert et al. and entitled "System and Method for Accounting for Activation of Stored Value Cards," and U.S. patent application Ser. No. 11/382,866, filed May 11, 2006 by Jennings, Jr. et al. and entitled "Security Systems for a Payment Instrument," all of which are incorporated herein by reference.

Briefly, in the operation of network 100, a customer visits a merchant or other location where the cards are displayed for sale, selects a card for purchase, and provides it to a clerk at one of the POS terminals 116. The card ID is captured (electronically read or manually entered) at the POS terminal 116. After the customer has paid for the card, the gift card DBMS 130 activates the card and stores a record of the activation in the database 132. In some cases the card 102 may have a pre-established face value (say, $100). In other cases, the card may be loaded with a monetary amount or have other terms selected by the purchaser, in which case such information is established at the time of purchase and then stored in database 132.

If the card is then provided to another person as a gift card, that person as the recipient and card user may subsequently present the card at a merchant location when making a purchase. The ID on the card is again read at one of the POS terminals (either with the assistance of a clerk, or at a self-service terminal. The identifying data (along with transaction information, such as the purchase amount) is provided to DBMS 130, which determines whether the card is both valid and activated (by comparing against records at the database 132), and if so, deducts the amount of the purchase against the value stored on the card (as reflected in database 132).

In accordance with embodiments of the invention, the network 100 and gift card system 126 include features to control or restrict the use of card 102 in order to prevent the card from being used by the card user or recipient in such a way as to deplete its value over a period of time that is less or shorter than that desired by the purchaser of the card. Such features are implemented, in one embodiment, by programming code resident at DBMS 130, along with data/parameters stored in database 132.

In some embodiments, there is associated with each card (and its identifying data or ID) a card category or type which determines certain card restrictions, such as the required interval of time between transactions by the card user, and the permitted maximum amount of each transaction. Accordingly, and as illustrated in FIG. 2, there is provided a table 210 within gift card database 132 that stores in association with each card ID, a card type 220 as well as a current balance 230 for that card. The card type may reflect various features or characteristics of the card. As examples, the card type may reflect the face amount of the card (if the card has as predetermined face value), or a card theme (e.g., a holiday gift card, a birthday gift card, a special promotional card for certain products offered by the merchant, and so forth). As mentioned earlier and as implemented in some embodiments described herein, the card type may also reflect whether there are certain restrictions or controls on the use of the card, and the nature of parameters associated with such restrictions.

In the table 210 seen FIG. 2, it is assumed that the illustrated card types "0001" and "0002" have no restrictions, but that card type "0007" may have certain restrictions. When the DBMS 130 accesses database table 210 and determines that a card has a card type designation (e.g., "0007") that indicates there may be restrictions associated with the card, the DBMS then accesses a card restriction table 310 associated with that card type, such as seen in FIG. 3.

In the table 310 of FIG. 3, there are two restrictions that may be activated with each card represented (by its card ID) within that table, specifically, a required interval between transactions and a maximum amount that may be conducted or posted for each transaction. Thus, there is associated with each card ID (having a card type "0007"), a last use date 320 reflecting the date of the last transaction for which the card was used, a required interval 330 reflecting the number of days that must have lapsed or passed between the last transaction and the next transaction, and a maximum transaction amount 340 reflecting the maximum amount of each transaction permitted when using the card. In addition, the table 310 has a restriction activation flag 350 associated with each card that is set based on whether the restrictions have been put in place on the card when the card is purchased.

As will be described in greater detail later in conjunction with FIG. 4, when a transaction is conducted using a card having a card type in table 210 indicating a restricted card, the DBMS 130 accesses table 310 and allows a transaction only if the transactions meets the parameters or restrictions as reflected in table 310. As an example, if the card having the card ID ending in the digits "1236" is presented at a POS terminal 116 for a transaction, table 310 indicates that the last transaction occurred on May 30, 2007 ("05302007"), that the next transaction must be at least one day later ("1"), and that a five dollar maximum ("5") is permitted for each transaction. The current transaction is authorized at DBMS 130 only if the transaction meets those restrictions.

Figure 4:
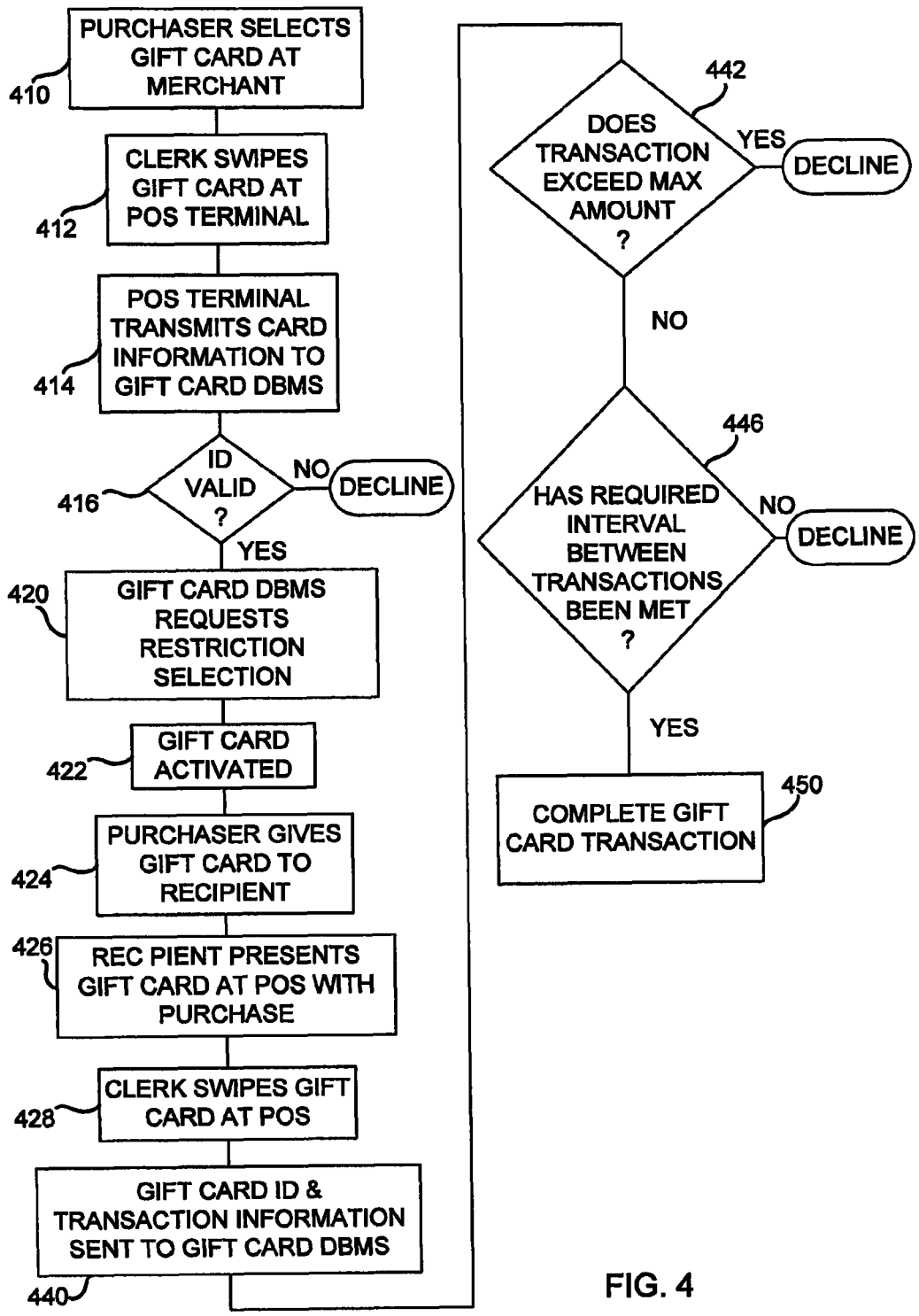
FIG. 4 is a flow diagram illustrating the operation of the network during activation and use of a gift card, according to one embodiment of the invention.

Referring now to FIG. 4, there is seen a flow diagram illustrating various steps within network 100 for activating and then subsequently using the card 102. Such steps may be implemented at least in part by programming resident within DBMS 130, in conjunction with the POS terminals 116 and retail network 120.

As seen, the customer first selects a gift card 102 at one of the merchant locations (step 410). The customer presents the selected card to a clerk at one of the POS terminals 116 at the merchant locations, where the card identifier or ID is read by swiping the card at a card reader at the POS terminal (step 412). The POS terminal transmits the card ID to the gift card DBMS 130 (step 414), which determines whether the card ID is valid and available for activation (step 416). The card purchase is declined at step 416 if the card ID is not valid or is not available (e.g., a card having the same ID has been previously activated, or is one reported as stolen). Otherwise, the process continues.

The card being purchased is assumed to be one for which the purchaser may elect restrictions (such as one having a card type "0007" described earlier in conjunction in FIGS. 2 and 3), and the gift card DBMS 130 requests that clerk at the POS terminal make various selections in connection with the activation of the card, pursuant to instructions from the customer purchasing the card (step 420). As described earlier in conjunction with FIG. 3, such selections may include affirming that the card is to be restricted (a "y" for the restriction activation flag 350), the number of days that are permitted between transactions for the required time interval 330, and the dollars for the maximum transaction amount 340.

After making the restriction selections, and paying the purchase price, the card is activated (step 422). The purchaser subsequently gives the gift card to the recipient or card user (step 424), so that the recipient may use the card to make a purchase by presenting it at one of the POS terminals 116 at a merchant location where the value of the card is being redeemed (step 426). The clerk at the POS terminal 116 swipes the card as part of the purchase or redemption (step 428), and the gift card ID and transaction data (e.g., amount of the transaction) is sent from the POS terminal 116 to the gift card DBMS 130 (step 440). The DBMS 130 determines at step 442 whether the transaction amount exceeds the permitted maximum that was selected at step 420, and that can be found within table 310. If exceeded, the transaction is declined. If not exceeded, the DBMS then determines whether the required interval between transactions has been met (step 446), by looking up the last use date 320 and the required interval 330 at table 310. If the required interval is met, the transaction is completed (step 450) and the amount of the transaction is deducted from the balance 230 in table 210. If the transaction is attempted before the expiration of the required interval (step 446), the transaction is declined.

While a detailed description of presently preferred embodiments of the invention has been given above, various alternatives, modifications, and equivalents will be apparent to those skilled in the art without varying from the spirit of the invention.

For example, the flow diagram in FIG. 4 is only one embodiment of a process that could be carried out by program steps within the network 100. Additional steps may be performed, some steps deleted, and the order of steps may be changed. Further, in an alternative embodiment, the gift card 102 may have a pre-established interval and a pre-established maximum transaction amount, without being selected by the purchasers. In such case the restriction selections by the purchaser at step 420 (FIG. 4) could be deleted (i.e., the restrictions requirements would be established within database 132 based on the type of card, rather than by purchaser selection). As another example, while the described embodiments pertain to a gift card, other embodiments may employ other types of stored value (SV) cards, such as (but not limited to) debit cards, prepaid credit cards, prepaid telephone cards, and prepaid money transfer cards. As yet another example, the card restriction table 310 could store a required maximum interval between uses, and compare that to the last use data. If too much time has elapsed since the last use, an alert could be generated at processing system 126. The alert could be sent back to the POS terminal 116 or to a third party (e.g., via email). This might be designed, e.g., so that a parent is assured that his child is using the card at frequent enough intervals, if the card is being used for necessities such as food, medicine, and so forth.

Also in some embodiments, the SV card need not be a physical card at all. It could be an issued number, PIN or alphanumeric code representing an SV account (e.g., as maintained in database 132), with the code remembered and used by the card user when conducting a transaction.

Therefore, the above description should not be taken as limiting the scope of the invention, which is defined by the appended claims.

What is claimed is:

1. A system for processing transactions using a stored value card, comprising:
   a POS terminal for capturing card identifying information when the card is used for a transaction;
   a database storing, in association with the card identifying information, transaction interval data defining a required time interval between transactions using the card and last use data defining the occurence of the last transaction using the card; and
   a management system for accessing the database in response to card identifying information captured at the POS terminal and authorizing a current transaction at the POS terminal only if the current transaction satisfies the required interval between the last transaction and the current transaction.

2. The system of claim 1,
   wherein the database further stores card type data for each card;
   wherein the interval data is stored for each card in association with the card type data for that card;
   wherein the card identifying information for an card captured at the POS is used to access the card type data in the database for that card; and
   wherein the accessed card type data is used to access the interval data for that card.

3. The system of claim 1, wherein the interval represented by the interval data represents a required number of days since the last transaction.

4. The system of claim 1, wherein the interval data includes the a permitted number of days between the last transaction and the date of the current transaction.

5. The system of claim 1, wherein the management system limits the transaction to a predetermined monetary amount.

6. The system of claim 1, wherein the stored value card is a gift card having a predetermined monetary value.

7. The system of claim 1, wherein the stored value card is purchased by a purchaser, and where the purchaser selects the required interval when activating the card.

8. A system for processing transactions using a stored value card, comprising:
   POS means for capturing card identifying information when the card is used for a transaction;
   database means for storing, in association with the card identifying information, transaction interval data defining a required time interval between transactions using the card and last use data defining the occurrence of the last transaction using the card; and
   a management system means for accessing the database in response to card identifying information captured at the POS means and authorizing a current transaction at the POS means only if the current transaction satisfies the required interval between the last transaction and the current transaction, and declining the current transaction if the current transaction does not satisfy the required interval between the last transaction and the current transaction.

9. A method for processing stored value card transactions, comprising:
   providing a card ID for a stored value card;
   storing interval data and last use data at a database, the interval data representing a required interval between transactions that are conducted using the card and the last use data defining the occurrence of the last transaction using the card;
   receiving, at a management system, card ID data captured at a POS device when the card is used for a transaction;
   using, at a management system, the card ID data captured at the POS device for a current transaction, to retrieve the interval data and the last use data from the database;
   authorizing, by the management system, the current transaction at the POS device only if the required interval has passed between the current transaction the last transaction.

10. The method of claim 9,
    wherein the database further stores card type data for each card;
    wherein the interval data is stored for each card in association with the card type data for that card;
    wherein the card ID data for an card received at the POS is used to access the card type data in the database for that card; and
    wherein the accessed card type data is used to access the interval data for that card.

11. The method of claim 9, wherein the interval represented by the interval data represents a required number of days since the last transaction.

12. The method of claim 9, further including the step limiting the transaction to a predetermined monetary amount.

13. The method of claim 9, wherein the stored value card is a gift card having a predetermined monetary value.

14. The method 9, wherein the stored value card is purchased by a purchaser, and where the purchaser selects the required interval when activating the card.

15. A system for processing transactions using a stored value card, wherein value stored on the card has been provided to a card user by a third party, the system comprising:
    a database for storing, in association with the card identifying information for each card, data defining a card type corresponding to each card, and for storing, in association with each card type, transaction interval data defining a required time interval between transactions and last use data defining the occurrence of the last transaction using the card; and a management system for accessing the database in response to card identifying information captured at a POS terminal from the card used at the POS terminal for a transaction, in order to obtain transaction interval data and last use data for the card type corresponding to the card used at the POS terminal, for authorizing a transaction at the POS terminal if the transaction satisfies the required time interval between transactions, and for providing an alert to the third party if the required interval between transactions has been exceeded.

* * * * *